(12) United States Patent
Hong et al.

(10) Patent No.: US 11,900,175 B2
(45) Date of Patent: Feb. 13, 2024

(54) COMPUTING DEVICE, COMPUTING EQUIPMENT AND PROGRAMMABLE SCHEDULING METHOD

(71) Applicant: Shanghai Biren Technology Co., Ltd, Shanghai (CN)

(72) Inventors: Zhou Hong, Shanghai (CN); YuFei Zhang, Shanghai (CN); ChengKun Sun, Shanghai (CN); Lin Chen, Shanghai (CN)

(73) Assignee: Shanghai Biren Technology Co., Ltd, Shanghai (CN)

( * ) Notice: Subject to any disclaimer, the term of this patent is extended or adjusted under 35 U.S.C. 154(b) by 218 days.

(21) Appl. No.: 17/524,700

(22) Filed: Nov. 11, 2021

(65) Prior Publication Data
US 2022/0156128 A1 May 19, 2022

(30) Foreign Application Priority Data
Nov. 17, 2020 (CN) .......................... 202011283070.4

(51) Int. Cl.
*G06F 9/48* (2006.01)
*G06F 9/52* (2006.01)
*G06F 9/54* (2006.01)
*G06T 1/20* (2006.01)

(52) U.S. Cl.
CPC ............. *G06F 9/52* (2013.01); *G06F 9/4881* (2013.01); *G06F 9/54* (2013.01); *G06T 1/20* (2013.01)

(58) Field of Classification Search
None
See application file for complete search history.

(56) References Cited

U.S. PATENT DOCUMENTS

| | | | | |
|---|---|---|---|---|
| 6,651,163 B1* | 11/2003 | Kranich | ................ | G06F 9/3851 |
| | | | | 712/228 |
| 10,846,251 B1* | 11/2020 | Caccamo | ................ | G06F 13/28 |
| 11,669,327 B2* | 6/2023 | Hong | ................... | G06F 3/0655 |
| | | | | 712/225 |
| 2011/0131381 A1* | 6/2011 | Kaplan | ............... | G06F 12/0875 |
| | | | | 711/E12.091 |
| 2011/0173394 A1* | 7/2011 | Gara | ................... | G06F 9/30087 |
| | | | | 711/125 |
| 2016/0124856 A1* | 5/2016 | Forsell | ............... | G06F 12/0813 |
| | | | | 711/128 |
| 2019/0378238 A1* | 12/2019 | Ramadoss | ............ | G06F 9/4881 |

(Continued)

*Primary Examiner* — Hyun Nam
(74) *Attorney, Agent, or Firm* — JCIP GLOBAL INC.

(57) ABSTRACT

The embodiments of the disclosure relate to a computing device, a computing equipment, and a programmable scheduling method for data loading and execution, and relate to the field of computer. The computing device is coupled to a first computing core and a first memory. The computing device includes a scratchpad memory, a second computing core, a first hardware queue, a second hardware queue and a synchronization unit. The second computing core is configured for acceleration in a specific field. The first hardware queue receives a load request from the first computing core. The second hardware queue receives an execution request from the first computing core. The synchronization unit configured to make the triggering of the load request and the execution request to cooperate with each other. In this manner, flexibility, throughput, and overall performance can be enhanced.

19 Claims, 4 Drawing Sheets

(56) References Cited

U.S. PATENT DOCUMENTS

| | | | |
|---|---|---|---|
| 2020/0065255 A1* | 2/2020 | Lebeane | G06F 12/1009 |
| 2020/0218965 A1* | 7/2020 | Sankaralingam | G06N 3/044 |
| 2020/0285579 A1* | 9/2020 | Chen | G06F 12/0842 |
| 2021/0042115 A1* | 2/2021 | Stephens | G06F 9/383 |
| 2022/0156128 A1* | 5/2022 | Hong | G06T 1/20 |

* cited by examiner

COMPUTING DEVICE, COMPUTING EQUIPMENT AND PROGRAMMABLE SCHEDULING METHOD

CROSS-REFERENCE TO RELATED APPLICATION

This application claims the priority benefit of China application serial no. 202011283070.4, filed on Nov. 17, 2020. The entirety of the above-mentioned patent application is hereby incorporated by reference herein and made a part of this specification.

BACKGROUND

Field of the Disclosure

The embodiments of the disclosure relate to the field of computer, and specifically relate to a computing device, a computing equipment, and a programmable scheduling method for data loading and execution in a computing device.

Description of Related Art

Conventional Domain Specific Accelerator (DSA) system based on application-specific integrated circuits (ASIC) can only achieve acceleration in a specific field. Since the ASIC has been fixed, the execution logic of the DSA system for some emerging computing requirements cannot be improved accordingly, which results in a lack of flexibility and poor forward compatibility.

SUMMARY OF THE DISCLOSURE

A computing device, a computing equipment, and a programmable scheduling method for data loading and execution in a computing equipment are provided, which can enhance flexibility, throughput and overall performance.

According to the first aspect of the disclosure, a computing device is provided. The computing device is coupled to a first computing core and a first memory in a computing equipment. The first computing core is configured for general graphics processing. The computing device includes: a scratchpad memory coupled to the first memory; a second computing core configured for acceleration in a specific field, and the second computing core being coupled to the scratchpad memory; a first hardware queue configured to receive a load request from the first computing core, and the first hardware queue being coupled to the first computing core and the first memory, and the load request instructing to load data from the first memory to the scratchpad memory; a second hardware queue configured to receive an execution request from the first computing core, and the second hardware queue being coupled to the first computing core and the scratchpad memory, and the execution request instructing to extract data from the scratchpad memory to the second computing core for execution; and a synchronization unit coupled to the first hardware queue and the second hardware queue, the synchronization unit being configured to make the triggering of the load request and the execution request cooperate with each other through the synchronization channel, the synchronization channel configuration information in the load request in the first hardware queue, and the synchronization channel configuration information in the execution request in the second hardware queue.

According to the second aspect of the disclosure, a computing equipment is provided. The computing equipment includes a first computing core, a first memory, and the computing device described in the first aspect of the disclosure. The first computing core is configured for general graphics processing, and the computing device is coupled to the first computing core and the first memory. A computing core is configured to add a load request to the first hardware queue in the computing device and to add an execution request to the second hardware queue in the computing device.

According to the third party aspect of the disclosure, a programmable scheduling method for data loading and execution in a computing equipment is provided. The computing equipment includes a first computing core, a first memory, a first hardware queue, a second hardware queue, a scratchpad memory, a second computing core, and a synchronization unit. The first computing core is configured for general graphics processing, and the second computing core is configured for acceleration in a specific field. The method includes: at the first computing core: a load request is added to the first hardware queue, the load request instructs to load data from the first memory to the scratchpad memory; and an execution request is added to the second hardware queue, the execution request instructs to extract data from the scratchpad memory to the second computing core for execution; and at the synchronization unit: the triggering of the load request and the execution request are made to cooperate with each other through the synchronization channel, the synchronization channel configuration information in the load request in the first hardware queue, and the synchronization channel configuration information in the execution request in the second hardware queue.

It should be understood that the content described in this section is not intended to flag key features or important features of the embodiments of the disclosure, nor is it intended to limit the scope of the disclosure. Other features of the disclosure will be more comprehensible through the following description.

BRIEF DESCRIPTION OF THE DRAWINGS

The above and other features, advantages, and aspects of the embodiments of the disclosure will become more apparent in conjunction with the accompanying drawings and with reference to the following detailed description. In the drawings, the same or similar reference signs indicate the same or similar elements.

DESCRIPTION OF EMBODIMENTS

The following describes exemplary embodiments of the disclosure with reference to the accompanying drawings, which include various details of the embodiments of the disclosure to facilitate understanding, and should be regarded as merely exemplary. Therefore, those of ordinary skill in the art should understand that various changes and modifications can be made to the embodiments described herein without departing from the scope and spirit of the disclosure. Likewise, for clarity and conciseness, descriptions of commonly-known functions and structures are omitted from the following description.

The term "including" and its variants as used herein means open-ended inclusion, that is, "including but not limited to". Unless specifically stated, the term "or" means "and/or". The term "based on" means "based at least in part on." The terms "one exemplary embodiment" and "one embodiment" mean "at least one exemplary embodiment." The term "another embodiment" means "at least one additional embodiment." The terms "first", "second", etc. may refer to different or the same objects. The following may also involve other explicit and implicit definitions.

As stated above, conventional DSA system based on ASIC lacks flexibility and therefore the forward compatibility is poor.

In order to solve the above problem, the disclosure provides a computing device, computing equipment, and a programmable scheduling method for data loading and execution, so that the triggering of the load request and the execution request cooperate with each other.

Figure 1:
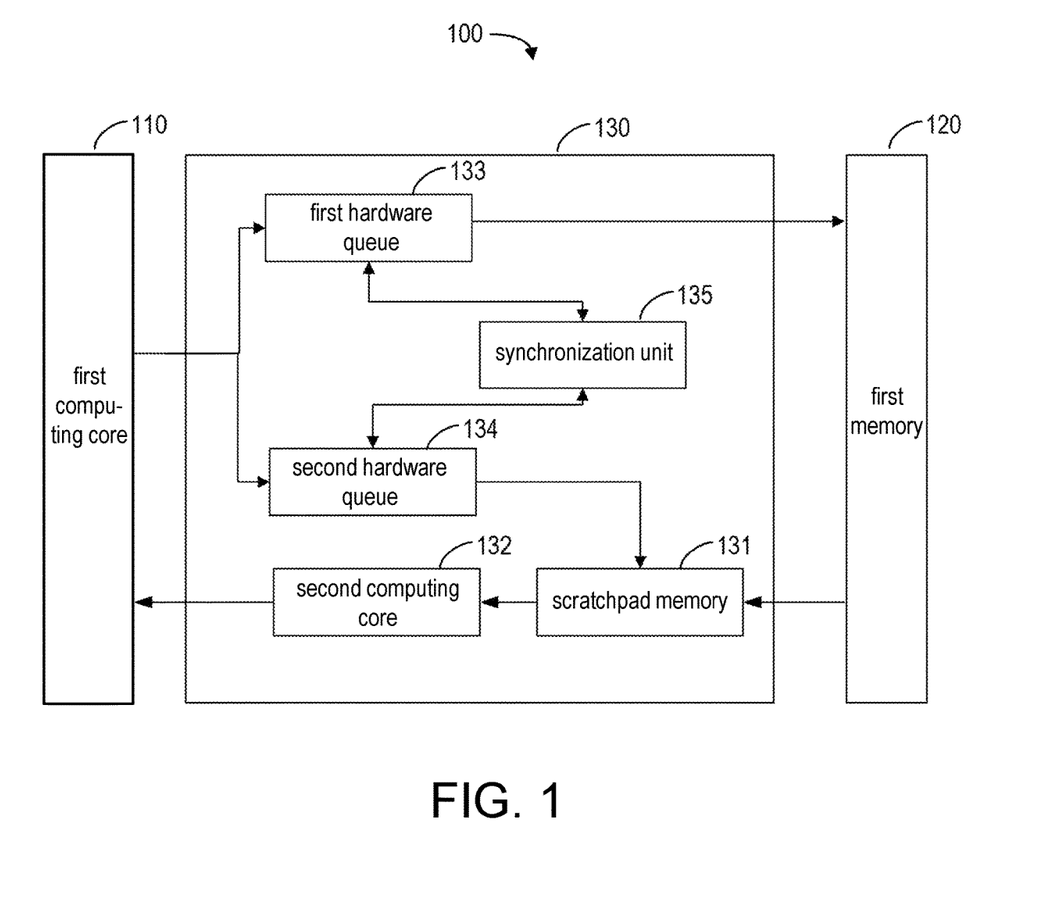
FIG. 1 is a schematic view of a computing equipment 100 embodied in an embodiment of the disclosure.

FIG. 1 shows a schematic block view of a computing equipment 100 embodied in an embodiment of the disclosure. As shown in FIG. 1, the computing equipment 100 includes a first computing core 110, a first memory 120 and a computing device 130, and the computing device 130 is coupled to the first computing core 110 and the first memory 120.

Regarding the first computing core 110, it can be configured for general graphics processing, for example, including but not limited to a General-Purpose computing on Graphics Processing Units (GPGPU) core.

Regarding the first memory 120, it includes, but is not limited to, a random storage memory, such as a static random access memory (SRAM) and a dynamic random access memory (DRAM), for example.

Regarding the computing device 130, it may include a scratchpad memory 131, a second computing core 132, a first hardware queue 133, a second hardware queue 134, and a synchronization unit 135.

Regarding the scratchpad memory 131, it is coupled to the first memory 120, and can receive and store data loaded from the first memory 120. The scratchpad memory 131 includes, but is not limited to, static random access memory (SRAM), for example. The scratchpad memory 131 is visible to programmers, for example, and can be programmed.

Regarding the second computing core 132, it can be used for acceleration in a specific field, for example, including but not limited to a field specific accelerator (DSA) core. The second computing core 132 is coupled to the scratchpad memory 131, and can receive data extracted from the scratchpad memory 131 and perform execution on the data. The first computing core 110 and the second computing core 132 can implement different types of computing tasks or computing tasks at different phases. In addition, the first computing core 110 may also control the execution of the second computing core 132 so that the second computing core 132 becomes a co-processing core of the first computing core 110.

Regarding the first hardware queue 133, it can be used to receive a load request from the first computing core 110. The first hardware queue 133 is coupled to the first computing core 110 and the first memory 120. The load request instructs to load data from the first memory 120 to the scratchpad memory 131. The load request may also be referred to as a load instruction.

The synchronization channel configuration information can be carried in the load request. The synchronization channel configuration information includes, but is not limited to, for example, a synchronization channel synchronization enable flag, a synchronization channel synchronization flag, a synchronization channel configuration enable flag, and a synchronization channel configuration flag.

In addition, the load request may also carry the first address in the first memory 120 and the second address in the scratchpad memory 131, so that the data on the first address in the first memory 120 can be loaded into the second address in the scratchpad memory 131.

Regarding the second hardware queue 134, it can be used to receive an execution request from the first computing core 110. The second hardware queue 134 is coupled to the first computing core 110 and the scratchpad memory 131. The execution request instructs to extract data from the scratchpad memory 131 to the second computing core 132 for execution. An execution request can also be regarded as an execution instruction.

The execution request can carry synchronization channel configuration information. The synchronization channel configuration information includes, but is not limited to, for example, a synchronization channel synchronization enable flag, a synchronization channel synchronization flag, a synchronization channel configuration enable flag, and a synchronization channel configuration flag.

In addition, the execution request may also carry the third address in the scratchpad memory 131, so that the data on the third address in the scratchpad memory 131 can be extracted to the second computing core 132. In some embodiments, the second address in the load request is the same as the third address in the execution request. In other embodiments, the second address in the load request is different from the third address in the execution request. The aforementioned synchronization channel configuration information and address information can be programmed by a programmer, for example, and thus can be flexibly set according to actual needs.

It can be obtained from the above that the first hardware queue 133 is configured to load data, and it serves as a data producer for the second computing core 132. The second computing core 132 consumes data from the scratchpad memory 131. The exit side of the second hardware queue 134 needs to check whether the data required to execute the request is ready before triggering the execution request.

The second computing core 132 releases the space of the scratchpad memory, which acts as a buffer unit space producer for the first hardware queue 133. The first hardware queue 133 needs to check whether the space of the buffer unit is ready before triggering a data load request to the first memory 120.

Therefore, the scratchpad memory 131 and the second computing core 132 form a producer and consumer relationship with each other.

Regarding the synchronization unit 135, it is coupled to the first hardware queue 133 and the second hardware queue 134, and may be implemented as electronic hardware, for example.

The synchronization unit 135 may be configured to use the synchronization channel, the synchronization channel configuration information in the load request in the first hardware queue 133, and the synchronization channel configuration information in the execution request in the second hardware queue 134 to make the triggering of the load request and the execution request to cooperate with each other. There may be multiple synchronization channels, for example, including but not limited to 32 or 64 synchronization channels, which can be divided into 2 groups, which are respectively used for data loading and execution.

In this manner, it is possible to realize the programmable scheduling of data loading and execution through the synchronization channel configuration information and synchronization channel in the load request and the execution request, so as to meet the synchronization between the producer and the consumer, and to enhance the flexibility and improve the forward compatibility. In the meantime, it is possible to maximize the use of on-chip resources to satisfy common and emerging computing requirements, and improve the throughput and overall performance. In addition, a DSA computing solution based on GPGPU is also provided.

The triggering process of the load request and the execution request will be described in detail below in conjunction with FIG. 3 and FIG. 4.

In some embodiments, the synchronization unit 135 may be configured to send a load request to the first memory 120 to load data from the first memory 120 to the scratchpad memory 131 based on whether the synchronization channel synchronization enable flag in the load request is set or not. For example, the load request may carry the first address in the first memory 120 and the second address in the scratchpad memory 131, so that the data on the first address in the first memory 120 can be loaded into the second address in the scratchpad memory 131.

The synchronization channel synchronization enable flag can be realized by the 1 bit in the load request, for example. For instance, the value 1 of this bit indicates that the synchronization channel synchronization enable flag is set, and the value 0 of this bit indicates that the synchronization channel synchronization enable flag is not set, or vice versa. It should be understood that 1 bit is only an example, and more bits can also be used for implementation, and the disclosure provides no limitation thereto.

Figure 3:
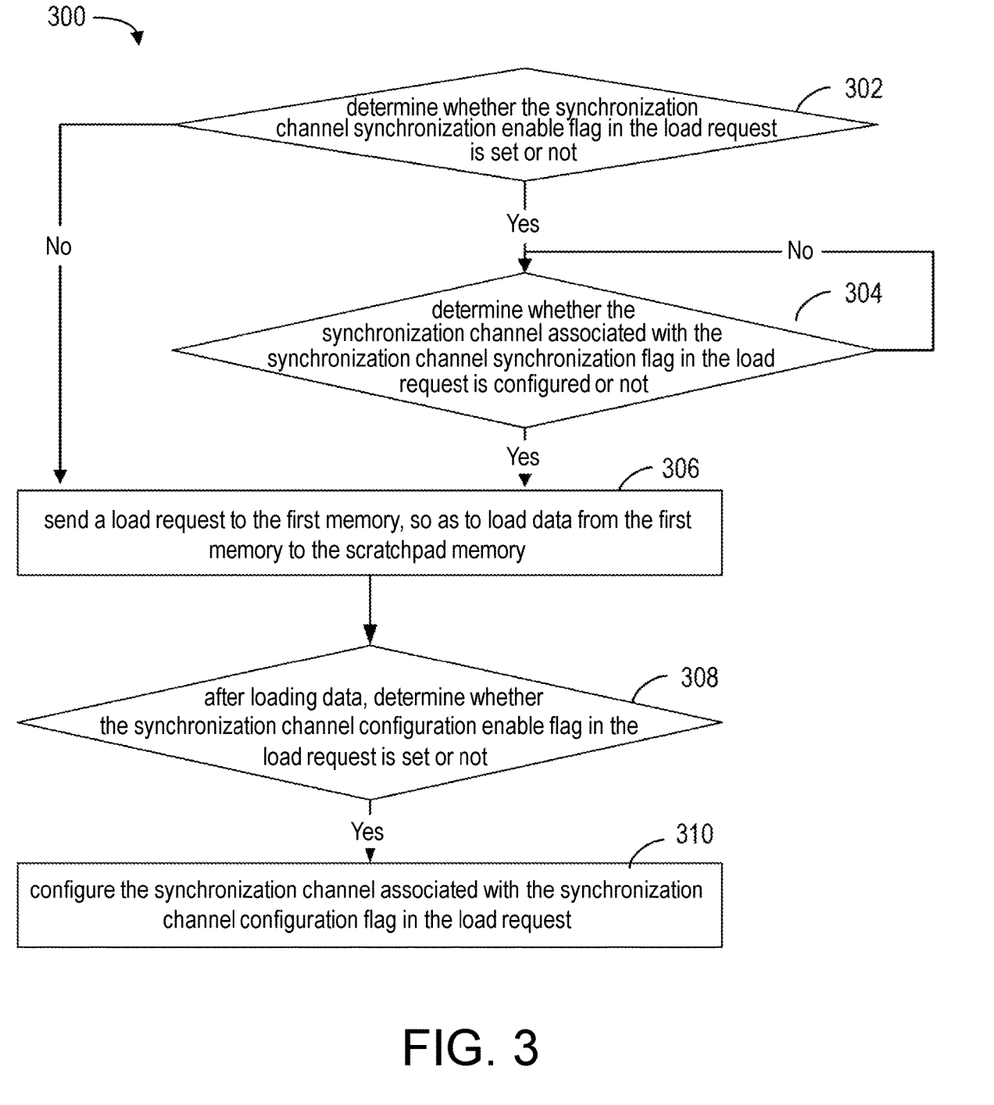
FIG. 3 is a schematic view of a load request triggering process 300 embodied in an embodiment of the disclosure.

Specifically, referring to FIG. 3, the synchronization unit 135 may be configured at step 302 to determine whether the synchronization channel synchronization enable flag in the load request is set or not. The synchronization unit 135 may further be configured to, if it is determined at step 302 that the synchronization channel synchronization enable flag in the load request is set, determine at step 304 whether the synchronization channel associated with the synchronization channel synchronization flag in the load request is set or not. The synchronization unit 135 may further be configured to, if it is determined at step 304 that the synchronization channel associated with the synchronization channel synchronization flag in the load request is set, send a load request to the first memory 120 at step 306, so as to load data from the first memory 120 to the scratchpad memory 131.

The synchronization channel synchronization flag in the load request indicates the synchronization channel to be waited for or synchronized by the load request, such as B. The setting of the synchronization channel indicates that the second address in scratchpad memory 131 indicated in the load request is already available, and the load request can be triggered to load data to the second address in the scratchpad memory 131. If the synchronization channel is not configured, it indicates that there is still data to be processed on the second address in the scratchpad memory 131 indicated in the load request, and the load request cannot be triggered to load data to the second address to prevent data overwriting.

In addition, the synchronization unit 135 may further be configured to, if it is determined at step 302 that the synchronization channel synchronization enable flag in the load request is not set, then at step 306, send a load request to the first memory 120 to load data from the first memory 120 into the scratchpad memory 131. If the synchronization channel synchronization enable flag is not set, it indicates that the load request is triggered directly without waiting for any synchronization channel. For example, for the initial load request, the scratchpad memory 131 is empty at this time, and therefore the load request does not need to wait for any synchronization channel. Accordingly, the synchronization channel synchronization enable flag may not be set, and the load request can be directly triggered.

After loading data from the first memory 120 to the scratchpad memory 131 (specifically, the second address in the scratchpad memory 131), the synchronization unit 135 may be configured to determine at step 308 whether the synchronization channel configuration enable flag in the load request is set or not. If it is determined at step 308 that the synchronization channel configuration enable flag in the load request is set, then the synchronization channel associated with the synchronization channel configuration flag in the load request is set at step 310.

Similar to the synchronization channel synchronization enable flag, the synchronization channel configuration enable flag can also be implemented by the 1 bit in the load request. For example, the value 1 of this bit indicates that the synchronization channel synchronization enable flag is set, and the value 0 of this bit indicates that the synchronization channel synchronization enable flag is not set, or vice versa. It should be understood that 1 bit is only an example, and more bits can also be used for implementation, and the disclosure provides no limitation thereto.

When the synchronization channel configuration enable flag is set, the load request will carry the synchronization channel configuration flag, such as A, which is used to indicate the synchronization channel to be configured. By configuring the synchronization channel associated with the synchronization channel configuration flag, it can be indicated that the loading of data from the first memory 120 to the second address in the scratchpad memory 131 has been completed, thereby indicating the execution request based on the data on the second address can be triggered.

Furthermore, the synchronization unit 135 may further be configured to determine whether the synchronization channel synchronization enable flag in the execution request is set or not. If it is determined that the synchronization channel synchronization enable flag in the execution request is set, based on the configuration of the synchronization channel associated with the synchronization channel synchronization enable flag in the execution request, the execution request is triggered to extract data from the scratchpad memory 131 to the second computing core 132 for execution.

Figure 4:
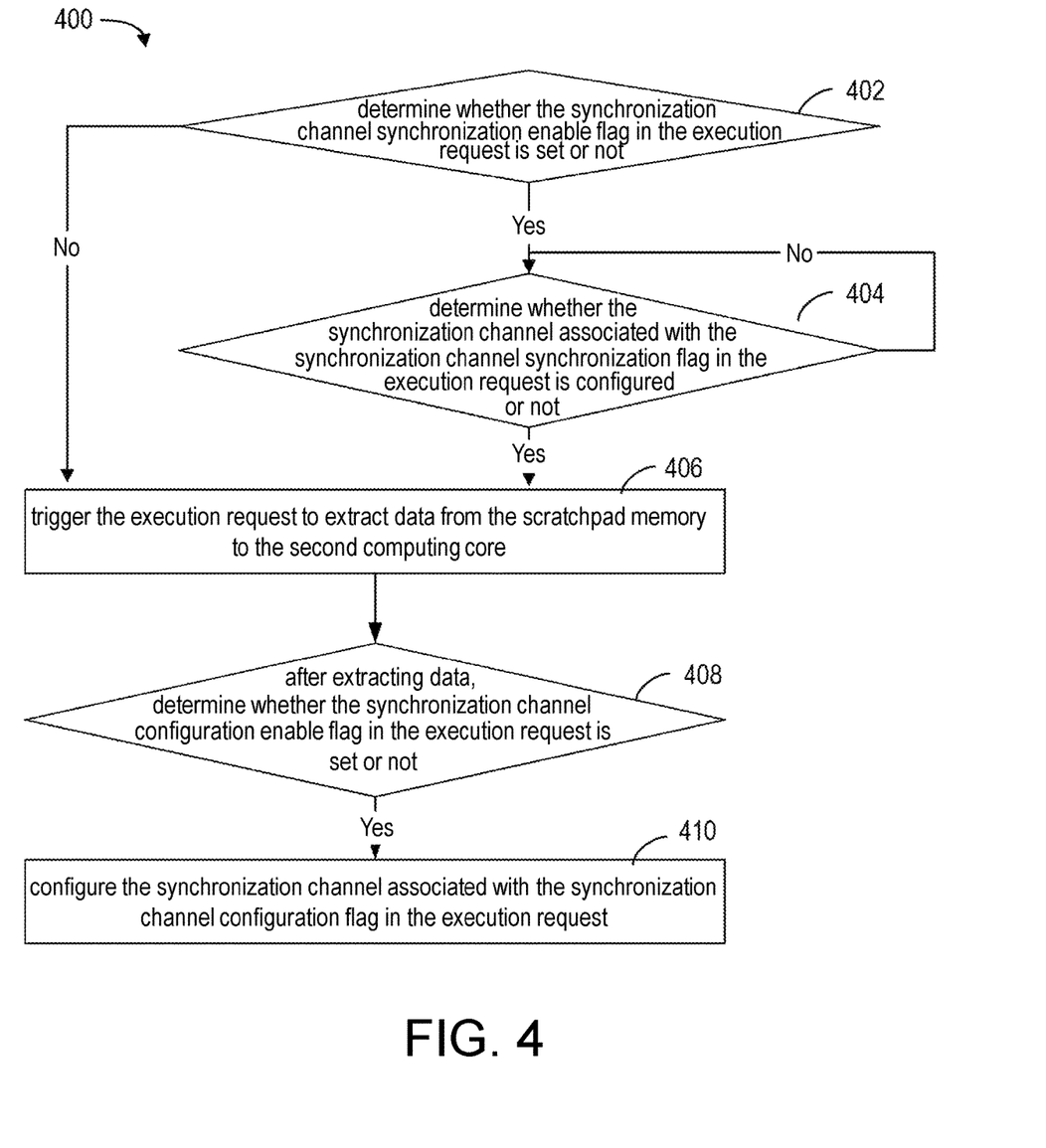
FIG. 4 is a schematic view of an execution request triggering process 400 embodied in an embodiment of the disclosure.

Specifically, referring to FIG. 4, the synchronization unit 135 may be configured to determine at step 402 whether the synchronization channel synchronization enable flag in the execution request is set or not. If it is determined at step 402 that the synchronization channel synchronization enable flag in the execution request is set, it is determined at step 404 whether the synchronization channel associated with the synchronization channel synchronization flag in the execution request is set or not. If it is determined at step 404 that the synchronization channel associated with the synchronization channel synchronization flag in the execution request is configured, the synchronization unit 135 may be configured to trigger the execution request at step 406 to extract data from the scratchpad memory 131 to the second computing core 132 for execution. The execution request may carry the third address in the scratchpad memory 131, so that the data on the third address in the scratchpad memory 131 can be extracted to the second computing core 132.

The synchronization unit 135 may further be configured to, if it is determined at step 402 that the synchronization channel synchronization enable flag in the execution request is not set, trigger the execution request at step 406 to extract data from the scratchpad memory 131 to the second computing core 132 for execution.

The synchronization channel synchronization enable flag can be realized by, for example, 1 bit in the execution request, which is similar to the synchronization channel synchronization enable flag in the load request described above, and therefore no further description is incorporated herein.

The configuration of the synchronization channel synchronization enable flag indicates that the execution request needs to wait for the synchronization channel. Under the circumstances, the execution request will carry the synchronization channel synchronization flag to indicate the synchronization channel to be waited for. The configuration of the synchronization channel indicates that the data on the third address in the scratchpad memory 131 indicated in the execution request has been loaded, and the execution request can be triggered. If the synchronization channel is not configured, it is indicated that the data on the third address in the scratchpad memory 131 indicated in the execution request has not been loaded yet, and the execution request cannot be triggered.

If the synchronization channel synchronization enable flag is not set, it is indicated that the execution request does not need to wait for any synchronization channel and can be triggered directly.

In some embodiments, the synchronization channel configuration flag in the load request is the same as the synchronization channel synchronization flag in the execution request. Under the circumstances, the second address is the same as the third address. The triggering of the execution request depends on the completion of the load request loading data from the first memory 120 to the scratchpad memory 131, that is, depends on the configuration of the synchronization channel associated with the synchronization channel configuration flag in the load request.

In other embodiments, the synchronization channel configuration flag in the load request is different from the synchronization channel synchronization flag in the execution request. Under the circumstances, the second address and the third address are different. The triggering of the execution request does not depend on the completion of the load request loading data from the first memory 120 to the scratchpad memory 131, that is, it does not depend on the configuration of the synchronization channel associated with the synchronization channel configuration flag in the load request.

Returning to FIG. 4, after extracting data from the scratchpad memory 131 (specifically, the third address in the scratchpad memory 131) to the second computing core 132, the synchronization unit 135 may further be configured to determine at step 408 whether the synchronization channel enable flag in the execution request is set or not. If it is determined at step 408 that the synchronization channel configuration enable flag in the execution request is set, then the synchronization channel associated with the synchronization channel configuration flag in the execution request is configured at step 410.

The synchronization channel configuration enable flag can also be implemented by 1 bit in the execution request, which is similar to the synchronization channel configuration enable flag in the load request above, and therefore no further description is incorporated herein.

When the synchronization channel configuration enable flag is set, the execution request will carry the synchronization channel configuration flag, such as A, which is used to indicate the synchronization channel to be configured. By setting the synchronization channel associated with the synchronization channel configuration flag, it can be indicated that the extraction of data from the third address in the scratchpad memory 131 to the second computing core 132 has been completed, thereby indicating that the load request based on the space of the third address can be triggered, so as to load data from the first memory 120 to the third address in the scratchpad memory 131.

In this manner, through this programmable scheduling of data loading and execution (also called programmable synchronization), the scratchpad memory and the second computing core work like a pipeline, and can load data and execute data completely in parallel. Such design satisfies the synchronization between producers and consumers, enhances flexibility and maximizes the use of on-chip resources to meet common and emerging computing requirements, and improve throughput and overall performance.

Figure 2:
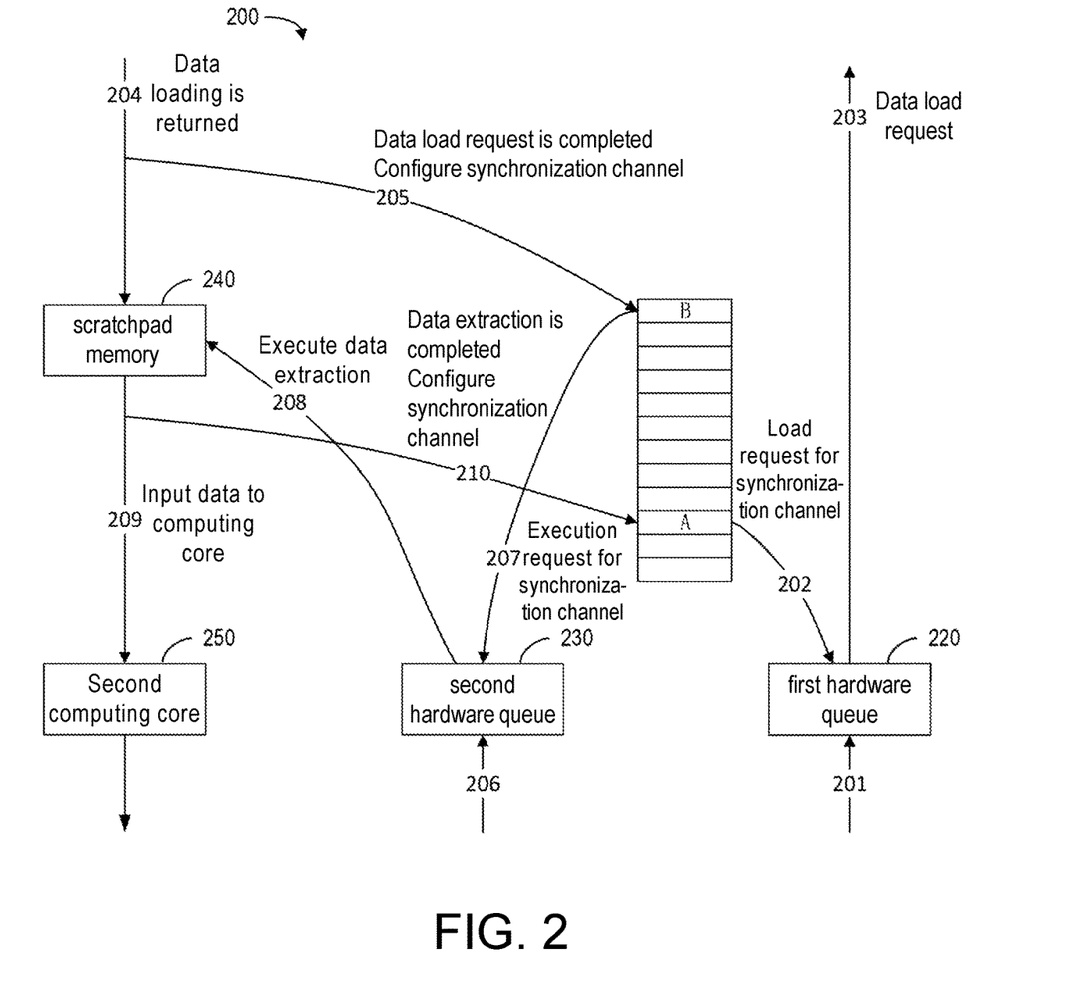
FIG. 2 is a schematic view of a programmable scheduling method 200 for data loading and execution in a computing equipment 110 embodied in an embodiment of the disclosure.

FIG. 2 shows a schematic view of a programmable scheduling process 200 for data loading and execution in the computing equipment 100 according to an embodiment of the disclosure.

As shown in FIG. 2, at step 201, the first computing core (not shown) adds a load request to the first hardware queue 220. Subsequently, if the synchronization channel synchronization enable flag and the synchronization channel synchronization flag, such as A, are set in the load request in the first hardware queue 220, then at step 202, wait for the synchronization channel (e.g. the synchronization channel A) associated with the synchronization channel synchronization flag to be configured. After the synchronization channel is configured, a load request is sent to the first memory (not shown) at step 203 to load data from the first memory to the scratchpad memory 240.

If the synchronization channel synchronization enable flag is not set in the load request in the first hardware queue 220, there is no need to wait for the synchronization channel, and the load request is directly sent to the first memory at step 203.

At step 204, data is loaded into the scratchpad memory 240 from the first memory.

After the data is loaded, if the synchronization channel configuration enable flag and the synchronization channel configuration flag, such as B, are set in the load request, the synchronization channel, such as the synchronization channel B, associated with the synchronization channel configuration flag is configured at step 205.

At step 206, the first computing core adds an execution request to the second hardware queue 230.

If the synchronization channel synchronization enable flag and the synchronization channel synchronization flag, for example, B, are set in the execution request in the second hardware queue 230, then at step 207, wait for the synchronization channel associated with the synchronization channel synchronization flag to be configured. After the synchronization channel is configured (for example, at step 205), an execution request is triggered at step 208 to extract data from the scratchpad memory 240 to the second computing core 250.

At step 209, the data is extracted from the scratchpad memory 240 to the second computing core 250, and then started to be executed in the second computing core 240.

After the data is extracted from the scratchpad memory 240 to the second computing core 250, if the synchronization channel configuration enable flag and the synchronization channel configuration flag, such as A, are set in the execution request, then the synchronization channel, such as synchronization channel A, associated with the synchronization channel configuration flag is configured at step 210, indicating that the space for executing input data in the scratchpad memory 240 has been fully used, and whether the space can be used so that subsequent load request based on the synchronization channel A can reuse the space of the scratchpad memory for loading data for subsequent execution request.

In this manner, the first hardware queue used for load requests and the second hardware queue used for execution requests, which are producers and consumers, can cooperate with each other through the synchronization channel to realize step in the manner of pipeline and increase the level of parallelism. As such, flexibility can be enhanced and the use of on-chip resources can be maximized to meet common and emerging computing requirements, thus improving throughput and overall performance.

Those skilled in the art can understand that the steps of method described here are not limited to the order shown exemplarily in the drawings, but can be executed in any other order feasible.

The above description of the disclosure is intended to enable any person of ordinary skill in the art to implement or use the disclosure. Various modifications of the disclosure are obvious to those of ordinary skill in the art, and the general principles defined herein can also be applied to other modifications without departing from the spirit and scope to be protected by the disclosure. Therefore, the disclosure is not limited to the examples and designs described herein, but is consistent with the broadest scope of the principles and novel features disclosed herein.

What is claimed is:

1. A computing device, coupled to a first computing core and a first memory in a computing equipment, wherein the first computing core is configured for general graphics processing, and the computing device comprises:
    a scratchpad memory, coupled to the first memory;
    a second computing core, configured for acceleration in a specific field, and coupled to the scratchpad memory;
    a first hardware queue, configured to receive a load request from the first computing core, and coupled to the first computing core and the first memory, wherein the load request instructs to load data from the first memory to the scratchpad memory;
    a second hardware queue, configured to receive an execution request from the first computing core, and coupled to the first computing core and the scratchpad memory, wherein the execution request instructs to extract data from the scratchpad memory to the second computing core for execution; and
    a synchronization unit, coupled to the first hardware queue and the second hardware queue, wherein the synchronization unit is configured to use a synchronization channel, synchronization channel configuration information in the load request in the first hardware queue, and synchronization channel configuration information in the execution request in the second hardware queue to make triggering of the load request and the execution request to cooperate with each other.

2. The computing device according to claim 1, wherein the synchronization unit is specifically configured to:
    send the load request to the first memory to load data from the first memory to the scratchpad memory based on whether a synchronization channel synchronization enable flag in the load request is set or not;
    after loading the data from the first memory to the scratchpad memory, if it is determined that a synchronization channel configuration enable flag in the load request is set, then configure the synchronization channel associated with a synchronization channel configuration flag in the load request; and
    if it is determined that the synchronization channel synchronization enable flag in the execution request is set, then trigger the execution request based on whether the synchronization channel associated with the synchronization channel synchronization flag in the execution request is configured or not, so as to extract the data from the scratchpad memory to the second computing core for execution.

3. The computing device according to claim 2, wherein the synchronization unit is further configured to:
    if it is determined that the synchronization channel synchronization enable flag in the load request is set, then determine whether the synchronization channel associated with the synchronization channel synchronization flag in the load request is configured or not; and
    if it is determined that the synchronization channel associated with the synchronization channel synchronization flag in the load request is configured, then send the load request to the first memory to load the data from the first memory to the scratchpad memory.

4. The computing device according to claim 2, wherein the synchronization unit is further configured to:
    if it is determined that the synchronization channel synchronization enable flag in the load request is not set, then send the load request to the first memory to load the data from the first memory to the scratchpad memory.

5. The computing device according to claim 2, wherein the synchronization unit is further configured to:
    if it is determined that the synchronization channel associated with the synchronization channel synchronization flag in the execution request is configured, then trigger the execution request to extract the data from the scratchpad memory to the second computing core for execution.

6. The computing device according to claim 2, wherein the synchronization unit is further configured to:
    if it is determined that the synchronization channel synchronization enable flag in the execution request is not set, then trigger the execution request to extract the data from the scratchpad memory to the second computing core for execution.

7. The computing device according to claim 2, wherein the synchronization unit is further configured to:
    after extracting the data from the scratchpad memory to the second computing core, if it is determined that the synchronization channel configuration enable flag in the execution request is set, then configure the synchronization channel associated with the synchronization channel configuration flag in the execution request.

8. The computing device according to claim 2, wherein the synchronization channel configuration flag in the load request is the same as or different from the synchronization channel synchronization flag in the execution request.

9. The computing device according to claim 7, wherein the synchronization channel synchronization flag in the load request is the same as or different from the synchronization channel configuration flag in the execution request.

10. A computing equipment, comprising a first computing core, a first memory, and the computing device comprises:
a scratchpad memory, coupled to the first memory;
a second computing core, configured for acceleration in a specific field, and coupled to the scratchpad memory;
a first hardware queue, configured to receive a load request from the first computing core, and coupled to the first computing core and the first memory, wherein the load request instructs to load data from the first memory to the scratchpad memory;
a second hardware queue, configured to receive an execution request from the first computing core, and coupled to the first computing core and the scratchpad memory, wherein the execution request instructs to extract data from the scratchpad memory to the second computing core for execution; and
a synchronization unit, coupled to the first hardware queue and the second hardware queue, wherein the synchronization unit is configured to use a synchronization channel, synchronization channel configuration information in the load request in the first hardware queue, and synchronization channel configuration information in the execution request in the second hardware queue to make triggering of the load request and the execution request to cooperate with each other,
wherein the first computing core is configured for general graphics processing, the computing device is coupled to the first computing core and the first memory, and the first computing core is configured to add a load request to a first hardware queue in the computing device and add an execution request to a second hardware queue in the computing device.

11. A programmable scheduling method for data loading and execution in a computing equipment, the computing equipment comprising a first computing core, a first memory, a first hardware queue, a second hardware queue, a scratchpad memory, a second computing core, and a synchronization unit, wherein the first computing core is configured for general graphics processing, and the second computing core is configured for acceleration in a specific field, and the method comprising:
at the first computing core:
adding a load request to the first hardware queue, wherein the load request instructs to load data from the first memory to the scratchpad memory; and
adding an execution request to the second hardware queue, wherein the execution request instructs to extract the data from the scratchpad memory to the second computing core for execution; and
at the synchronization unit:
using a synchronization channel, synchronization channel configuration information in the load request in the first hardware queue, and synchronization channel configuration information in the execution request in the second hardware queue to make triggering of the load request and the execution request to cooperate with each other.

12. The method according to claim 11, wherein the step of making triggering of the load request and the execution request to cooperate with each other comprises:
sending the load request to the first memory to load data from the first memory to the scratchpad memory based on whether a synchronization channel synchronization enable flag in the load request is set or not;
after loading the data from the first memory to the scratchpad memory, if it is determined that a synchronization channel configuration enable flag in the load request is set, then configuring the synchronization channel associated with a synchronization channel configuration flag in the load request; and
if it is determined that the synchronization channel synchronization enable flag in the execution request is set, then triggering the execution request based on whether the synchronization channel associated with the synchronization channel synchronization flag in the execution request is configured or not, so as to extract the data from the scratchpad memory to the second computing core for execution.

13. The method according to claim 12, wherein the step of sending the load request to the first memory comprises:
if it is determined that the synchronization channel synchronization enable flag in the load request is set, then determining whether the synchronization channel associated with the synchronization channel synchronization flag in the load request is configured or not; and
if it is determined that the synchronization channel associated with the synchronization channel synchronization flag in the load request is configured, then sending the load request to the first memory to load the data from the first memory to the scratchpad memory.

14. The method according to claim 12, wherein the step of sending the load request to the first memory comprises:
if it is determined that the synchronization channel synchronization enable flag in the load request is not set, then sending the load request to the first memory to load the data from the first memory to the scratchpad memory.

15. The method according to claim 12, wherein the step of triggering the execution request comprises:
if it is determined that the synchronization channel associated with the synchronization channel synchronization flag in the execution request is configured, then triggering the execution request to extract the data from the scratchpad memory to the second computing core for execution.

16. The method according to claim 12, wherein the step of making triggering of the load request and the execution request to cooperate with each other further comprises:
if it is determined that the synchronization channel synchronization enable flag in the execution request is not set, then triggering the execution request to extract the data from the scratchpad memory to the second computing core for execution.

17. The method according to claim 12, wherein the step of making triggering of the load request and the execution request to cooperate with each other further comprises:
after extracting the data from the scratchpad memory to the second computing core, if it is determined that the synchronization channel configuration enable flag in the execution request is set, then configuring the synchronization channel associated with the synchronization channel configuration flag in the execution request.

18. The method according to claim 12, wherein the synchronization channel configuration flag in the load request is the same as or different from the synchronization channel synchronization flag in the execution request.

19. The method according to claim 17, wherein the synchronization channel synchronization flag in the load request is the same as or different from the synchronization channel configuration flag in the execution request.

* * * * *